(12) United States Patent
Robinson et al.

(10) Patent No.: US 8,992,182 B2
(45) Date of Patent: Mar. 31, 2015

(54) TIME-BASED MULTI-MODE PUMP CONTROL

(75) Inventors: David G. Robinson, Cary, NC (US); Keith A. Wells, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/524,782

(22) Filed: Jun. 15, 2012

(65) Prior Publication Data

US 2013/0336804 A1  Dec. 19, 2013

(51) Int. Cl.
G05D 7/06 (2006.01)
G05D 9/12 (2006.01)

(52) U.S. Cl.
CPC ............ *G05D 7/0617* (2013.01); *G05D 9/12* (2013.01)
USPC ................ 417/12; 417/36; 417/53; 700/282

(58) Field of Classification Search
CPC .............................. G05D 7/0617; G05D 9/12
USPC ............. 417/53, 12.36, 40; 700/282
See application file for complete search history.

(56) References Cited

U.S. PATENT DOCUMENTS

| | | | |
|---|---|---|---|
| 3,854,846 A | 12/1974 | Douglas | |
| 4,476,423 A | 10/1984 | Mallick, Jr. et al. | |
| 5,064,349 A * | 11/1991 | Turner et al. | 417/53 |
| 5,251,696 A | 10/1993 | Boone et al. | |
| 5,549,157 A | 8/1996 | Johnson et al. | |
| 5,782,608 A * | 7/1998 | McKee | 417/43 |
| 7,549,287 B2 | 6/2009 | Foster et al. | |
| 7,634,328 B2 | 12/2009 | Medizade et al. | |
| 7,870,900 B2 * | 1/2011 | Dorado et al. | 166/250.15 |
| 8,011,895 B2 | 9/2011 | Ruffo | |
| 8,019,479 B2 | 9/2011 | Stiles et al. | |
| 2002/0106280 A1 * | 8/2002 | Beard et al. | 417/3 |
| 2007/0021874 A1 * | 1/2007 | Rognli et al. | 700/295 |
| 2009/0324427 A1 * | 12/2009 | Tolbert et al. | 417/13 |

OTHER PUBLICATIONS

Author Unknown, Variable Speed Drives for Water Pumps, Webpage/site, Last archived/updated Aug. 28, 2010, pp. 1-2, Yost Electric, Inc., Published at: http://www.yostelectric.com/vfd_swp.php (archived at: http://web.archive.org/web/20100828093828/http://www.yostelectric.com/vfd_swp.php).

* cited by examiner

*Primary Examiner* — Devon Kramer
*Assistant Examiner* — Kenneth J Hansen
(74) *Attorney, Agent, or Firm* — Lee Law, PLLC; Christopher B. Lee

(57) ABSTRACT

Times of at least one of on cycles and off cycles of a pump operating in one of a sub-pump mode and a continuous pumping mode are monitored. A determination is made as to whether to switch the pump from the one of the sub-pump mode and the continuous pumping mode to the other of the sub-pump mode and the continuous pumping mode based upon the monitored times of the at least one of the on cycles and the off cycles of the pump. The pump is switched to the other of the sub-pump mode and the continuous pumping mode in response to determining to switch the pump from the one of the sub-pump mode and the continuous pumping mode to the other of the sub-pump mode and the continuous pumping mode.

20 Claims, 8 Drawing Sheets

TIME-BASED MULTI-MODE PUMP CONTROL

BACKGROUND

The present invention relates to pumping systems. More particularly, the present invention relates to time-based multi-mode pump control.

Pumps are used in a variety of applications to move liquids/fluids from one location to another. For example, pumps are utilized in wells to tap into ground aquifers and in storage tanks to collect/dispense water, oil, gasoline, chemicals, and other liquids. Additionally, pumps are utilized in sumps to remove water from structures (e.g., basements and crawl spaces). Pumps are also used in septic systems and treatment plants to move and distribute effluent for treatment. Pumps are further used in pipeline applications to move oil and other liquids from one geographic location to another.

BRIEF SUMMARY

A method includes monitoring times of at least one of on cycles and off cycles of a pump operating in one of a sub-pump mode and a continuous pumping mode; determining whether to switch the pump from the one of the sub-pump mode and the continuous pumping mode to the other of the sub-pump mode and the continuous pumping mode based upon the monitored times of the at least one of the on cycles and the off cycles of the pump; and switching the pump to the other of the sub-pump mode and the continuous pumping mode in response to determining to switch the pump from the one of the sub-pump mode and the continuous pumping mode to the other of the sub-pump mode and the continuous pumping mode.

A system includes a timer and a processor programmed to monitor, using the timer, times of at least one of on cycles and off cycles of a pump operating in one of a sub-pump mode and a continuous pumping mode; determine whether to switch the pump from the one of the sub-pump mode and the continuous pumping mode to the other of the sub-pump mode and the continuous pumping mode based upon the monitored times of the at least one of the on cycles and the off cycles of the pump; and switch the pump to the other of the sub-pump mode and the continuous pumping mode in response to determining to switch the pump from the one of the sub-pump mode and the continuous pumping mode to the other of the sub-pump mode and the continuous pumping mode.

A computer program product includes a computer readable storage medium including computer readable program code, where the computer readable program code when executed on a computer causes the computer to monitor times of at least one of on cycles and off cycles of a pump operating in one of a sub-pump mode and a continuous pumping mode; determine whether to switch the pump from the one of the sub-pump mode and the continuous pumping mode to the other of the sub-pump mode and the continuous pumping mode based upon the monitored times of the at least one of the on cycles and the off cycles of the pump; and switch the pump to the other of the sub-pump mode and the continuous pumping mode in response to determining to switch the pump from the one of the sub-pump mode and the continuous pumping mode to the other of the sub-pump mode and the continuous pumping mode.

DETAILED DESCRIPTION

Figure 1:
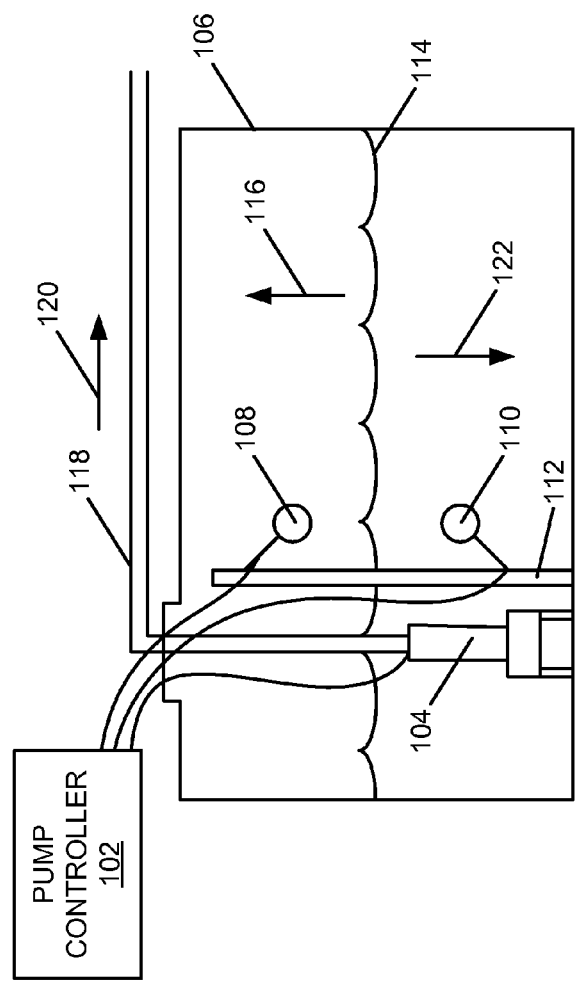
FIG. 1 is a diagram of an example of an implementation of a system for automated time-based multi-mode pump control according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides time-based multi-mode pump control. The time-based multi-mode pump control utilizes a variable-speed pump and provides two operational modes of control of the variable-speed pump. A first mode of pump operation emulates a continuous-pressure style control of a pump without the use of a pressure transducer usable during higher volumetric flow periods (e.g., seasonal wet periods, etc.). A second mode of operation is a sub-pump mode useable during lower volumetric periods (e.g., seasonal dry periods, etc.). On/off cycles of the variable-speed pump are monitored over time and the pump is switched between the two modes of operation based upon frequency of the on/off cycles. During the continuous mode of operation, the speed of the pump is gradually decreased to a level where the pump runs as long as possible without a dead head (e.g., pump dry) condition. This level of pump speed may be stored as a pump operating minimum speed and utilized during the next on cycle for the pump, and further adjustments may then be made based upon the current fluid pumping conditions. As such, the present technology allows a variable-speed pump installation to "self tune" over a wide range of pumping conditions.

For purposes of the present description, it is understood that pumps are used to move fluid and that pumps are operated by the use of electric or other motors that provide power to the pumps. As such, the terms "pump" and "motor" may be utilized interchangeably in certain situations within the following description to facilitate ease of description.

The present technology supports pumping applications where the volume of liquid to be pumped may vary widely over time, such as daily, seasonal, and other time periods. The present technology provides an inexpensive and low maintenance approach to instrumenting a pump installation so that a pump control unit may automatically detect when to switch between pumping modes without a holding tank and without reliance upon relatively expensive pressure transducers. The present technology may be used with a variety of fluid level sensing technologies including, for example, float switches, solid state impedance switches on pumps, and other level sensing technologies as appropriate for a given implementation.

It should be noted that conception of the present subject matter resulted from recognition of certain limitations associated with pumping systems. For example, it was determined that running a pump at a slower speed in a continuous mode results in lower electricity usage, lower peak current draw, less wear and tear on the motor and pump, and less wear and tear on piping. It was additionally observed that during rainy periods, sub-pumps often cycle on and off repeatedly and operate at full speed for relatively short time periods. It was further observed that certain pumping applications, such as within chemical or other factories, may have varying demand for liquids that are pumped. As a consequence of these observations, it was determined that such installations may benefit from a multi-mode operation of a pump that emulates a continuous pressure pumping system during higher-volume pumping periods and that operates as a sub-pump during lower-volume pumping periods. The present subject matter improves pump control processing by providing for time-based multi-mode pump control, as described above and in more detail below. As such, improved motor and pump life may be obtained, and maintenance costs may be reduced, by use of the present subject matter.

As described above, the variable-speed pump may initially be configured to operate in one of the two modes, such as for example in the sub-pump mode. The pump's behavior may be algorithmically monitored over time and controlled. As the volume of liquid to be pumped increases (e.g., during rain storms, during seasonal wet periods, etc.), the pump mode may be automatically converted to a continuous pumping mode for a period of time. The pump speed may be tuned (e.g., reduced or increased as appropriate for the current pumping demand) during the continuous pumping mode over time and/or pump cycles until a minimum effective pump speed that results in the longest possible continuous pumping duration based upon the quantity of water to be pumped is achieved. The pumping mode may then be reverted back to a sub-pump pumping mode as the volume of liquid to be pumped decreases (e.g., after rain storm water has been removed, during seasonal dry periods, etc.). As such, the present subject matter provides for dynamically and automatically tuning the pump motor speed without the use of pressure transducers. It should be noted that while the examples herein utilize a higher speed initially for pump tuning during the continuous pumping mode, this should not be considered limiting because the algorithmic processing described herein may alternatively be implemented to begin a continuous pumping mode phase of operation at a lower speed and increase the pumping speed over time until a minimum effective pump speed is determined. As such, both of these forms of algorithmic control including other variations are considered within the scope of the present subject matter.

A pump control unit is attached to the variable-speed pump/motor and monitors the on and off cycles of the pump/motor over time. The on/off cycles may be monitored by float or level sensor activations and deactivations, current sensing for a motor that drives the pump, or otherwise as appropriate for a given implementation. For purposes of the examples described below, high and low float or level sensors may alternatively be referred to as "full" or "high" switches and "empty" or "low" switches, respectively. It is additionally assumed for purposes of the examples that follow that the pump is initially configured to operate in the sub-pump mode as a default. However, it is understood that either the sub-pump mode of operation or the continuous pump mode of operation may be configured as the default mode of operation as appropriate for a given implementation.

Returning to the description of the pump control unit, and again assuming a default initial sub-pump mode of operation, if the monitored frequency of the on/off cycles of the motor/pump exceeds a predetermined count (e.g., a configured threshold) over a configured period of time, the pump control unit switches the pump into a continuous pumping mode. The predetermined count over the period of time may be initially configured during setup and automatically tuned by the pump control unit over time. Alternatively, the predetermined count over the period of time may be initially programmatically configured by the pump control unit during an initial startup based upon initial fluid influx detection (e.g., detected high fluid signals) and automatically tuned over time by the pump control unit during run time. As such, an installation of the present technology may learn from the environment it is placed within without extensive setup or advanced configuration.

After transitioning to the continuous pumping mode, the pump operates in the continuous pumping mode over time. The pump control unit repeatedly monitors the on/off cycles and adjusts the motor speed (e.g., decreases the speed) to allow the motor/pump to run in a continuous mode as long as possible during each power-on cycle. The pump control unit may iteratively and continuously tune the pump speed based upon the monitored/detected on/off cycles of the motor/pump.

For example, based on the configuration or installation environment, once the number of on/off cycles exceeds the configured threshold for the given period of time, the pump control unit slows the speed of the motor/pump the next time the "full" switch triggers the pump to run. The pump control unit may adjust the motor/pump speed so that the pump runs at less than one hundred percent (100%) pumping volume. The pump control unit may, for example, start the pump motor at ninety five percent (95%) of the pump's variable speed range. This will cause the pumping cycle to run longer because the motor is running at a slower speed. Assuming the pump is still able to pump enough liquid to vacate a sump area, the "low" switch will eventually trip and signal and the pump to shut off (a "pump dry" scenario may also be detected by the current requirements dropping for the motor). In a high volume pumping period, the liquid will quickly flow in and trigger the "full" float switch again signaling time for another pump run.

Depending on how long it takes the pump to clear the liquid running at 95%, and possibly even factoring in the amount of time between the low and high switch signals, the pump control unit may decide to run the motor more slowly on the next pumping cycle. The pump control unit gradually decreases the motor speed each time until a scenario occurs when the "full" switch is either not cleared by the pumping (liquid fills up the sump/tank faster than it is pumped out so the high switch stays active) or the full switch is tripped even when the pump is running (the pump starts to empty the area, but then can't keep up). If either situation occurs, the pump control unit increases the motor/pump speed by one or more increments over time.

When the "full" switch is triggered even when pumping, the pump control unit determines that the current pump speed is a configurable minimum speed for the current pumping situation. The pump control unit may then configure and store this minimum speed for reuse during future pumping cycles. The next time the pump turns on, the pump control unit may utilize either the configured minimum speed or a pumping rate slightly above the minimum speed to achieve a long-duration motor/pump run without the motor/pump turning off. This adjustment of motor speed may continue dynamically during a high volume pumping period.

Eventually, such as for example in a sub-pump type of installation environment while in the continuous pumping mode, the volume of fluid to be pumped will diminish to the point where the pump turns off for a long period of time (e.g., a seasonal dry period). Depending on the configuration or installation environment, after the pump is inactive for a long period of time (e.g., idle time), the pump control unit may revert the pump to the sub-pump mode. This idle time period may also be dynamically configurable by the pump control unit. When the pump turns off for a long period of time, the pump control unit may either reset the pump so that it will run one hundred percent (100%) on the next pump run within the sub-pump mode starting the algorithmic control of the motor/pump again, or may recall the configured/stored minimum speed from the last continuous pumping mode and start the pump running at that speed the next time the pump activates.

As such, the present technology provides a transducer-less emulation of a "continuous pressure" pumping system to provide some of the benefits of a continuous pressure pumping system at relatively lower cost when compared with the cost, for example, of pressure transducers or flow transducers. The technology described herein also utilizes less wiring and may function in environments that may not have holding tanks.

While the examples described above and in more detail below describe actions processed according to switch transitions or triggers (e.g., full and low switch triggers), the present subject matter may further be utilized to dynamically adjust the mechanical set points of the respective switches or floats. For example, during wet-season pumping conditions when a pump is configured to operate in the continuous pumping mode, on and off times for a pump may be measured over subsequent continuous pumping cycles where the pump is not transitioned back to the sub-pump mode. Estimates of future switch actuations/deactuations may be formed based upon the measured continuous pumping cycles. Times for turning the pump on and off may be configured based upon these estimates to attempt to further extend continuous pumping during future continuous pumping cycles. For example, the pump may be turned on at a slower speed than the configured minimum at a configured time before an anticipated/estimated next full switch signal or after a detected full switch signal to attempt to further extend the pumping cycle. Similarly, the pump may be turned off at a configured time period after the low switch signal is detected or before an anticipated/estimated next low switch signal to also attempt to further extend the continuous pumping cycle. As such, mechanical set points for pumping environments may be dynamically adjusted to further enhance continuous mode operation for pumping environments.

The time-based multi-mode pump control described herein may be performed in real time to allow prompt transition between multiple modes of operation for a pumping installation. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a diagram of an example of an implementation of a system 100 for automated time-based multi-mode pump control. The system 100 of the present example utilizes a two-float system. However, it is understood that a single float may be utilized without departure from the scope of the present subject matter.

A pump controller device 102 controls operation of a pump 104 within an enclosure 106. It is understood that the enclosure 106 may be a tank, pipe, sump, or any structure as appropriate for a given implementation. It is additionally understood that, while the present example utilizes the enclosure 106 for ease of description purposes, an enclosure is not needed to implement the present technology. For example, the pump 104 may be located "outside" of an enclosure and may have hoses on the intake and output parts of the pump to implement the present technology. Additionally, the present technology may be utilized to fill a chemical tank, such as within a factory or other environment. Within such an implementation, during peak periods of withdrawal of chemicals from the chemical tank, the pump may tune itself to run continuously to keep liquid in the chemical tank. The pump may further be transitioned to a "sub-pump" mode to fill the tank and stop pumping when demand that is withdrawing chemicals from the tank drops or stops. As such, the present technology may be implemented within a variety of environments and platforms, and may be implemented to change the pumping mode of one or more pumps, such as the pump 104, based upon demand, and all such environments and platforms are considered within the scope of the present subject matter.

It should additionally be noted that the present example utilizes float technology and algorithmically tunes float signaling relative to mechanical "presets" of the floats. However, as discussed above, solid state impedance switches on pumps and other level sensing technologies may be utilized as appropriate for a given implementation. In a solid state impedance switch implementation, if the "presets" are electronic/electrical, then the presets may be automatically configured and adjusted by changing the impedance thresholds that trigger the processor to turn the motor on and off. Other variations on preset control and adjustment are possible and all are considered within the scope of the present subject matter.

The pump 104 has a motor integrated with it that operates the pump 104 within the present example. However, this should also not be considered limiting because the motor may be connected via belts, gears, or a drive shaft, as appropriate for a given implementation. As a result, a pump, such as the pump 104 also does not have to be physically located within an enclosure. As such, many variations of implementation of the present technology are possible and all are considered within the scope of the present subject matter.

A high float 108 and a low float 110 are suspended on a float tree 112. The high float 108 and the low float 110 provide inputs to the pump controller device 102 that are utilized to control the pump 104, as described above and in more detail below. The mounting positions of the respective floats on the float tree 112 determine the mechanical set points for the respective floats. As described above, the present subject matter may further be utilized to dynamically adjust these mechanical set points of the high float 108 and the low float 110 using estimates formed from measured actuations of the high float 108 and the low float 110 during periods of operation of the pump 104 in the continuous pumping mode.

The low float 110 is shown in an elevated (e.g., floating) position, while the high float 108 is shown in a non-elevated (e.g., non-floating) position. As a water level 114 rises within the enclosure 106 as depicted by an arrow 116 to a height/level sufficient to cause the high float 108 to transition from the non-elevated position to an elevated position similar to that depicted for the low float 110, a high fluid signal is generated to the pump controller device 102. The high fluid signal causes the pump controller device 102 to start the pump 104 and water is pumped from the enclosure 106 via an outlet 118 as represented by an arrow 120. Starting of the pump 104 is considered an "on cycle" or "on transition" for purposes of the present description.

It is understood that water will be pumped by the pump 104 out of the outlet 118 and that the high float 108 will transition from the elevated position to the non-elevated position during a pumping cycle for the enclosure 106. Such a transition will terminate the high fluid signal to the pump controller device 102. Within a single float system, the termination of the high fluid signal may be utilized to stop the pump 104. Within the present example of a two-float system, the pump controller device 102 will continue to cause the pump 104 to operate until a low fluid signal is received from the low float 110.

As the level of water in the tank decreases as depicted by an arrow 122 to a height/level sufficient to cause the low float 110 to transition from the elevated position to a non-elevated position similar to that depicted for the high float 108, a low fluid signal is generated to the pump controller device 102. The low fluid signal causes the pump controller device 102 to stop the pump 104 (i.e., an "off cycle").

It is additionally noted that the high fluid signal and the low fluid signal described above are described as inverted signals with respect to the respective flow positions within the present example for ease of description purposes. However, the state of the individual signals may be aligned with respect to float positions without departure from the scope of the present subject matter.

As will be described in more detail below in association with FIG. 2 through FIG. 5C, the pump controller device 102 provides automated time-based multi-mode pump control. The automated time-based multi-mode pump control is based upon the timing of the on/off cycles of the pump 104. The on and off cycles of the pump 104 are monitored over time by the pump controller device 102. The pump controller device 102 switches the operating mode and speed of the pump 104 over time based upon the timing of the on and off cycles of the pump 104. From the monitored on/off cycles of the pump 104, the pump controller device 102 deduces the characteristics of the fluid to be pumped (e.g., volume, rate, etc.) and changes the operating mode and operating characteristics of the pump 104, including the operating/pumping speed and pumping mode (e.g., continuous pumping mode versus subpump mode).

It should be noted that the pump controller device 102 may be any computing device capable of processing information as described above and in more detail below. For example, the pump controller device 102 may include devices such as an embedded controller device, a personal computer (e.g., desktop, laptop, etc.), or any other device capable of processing information as described in more detail below. The control operations of the pump controller device 102 may be monitored via network or other interconnection to the pump controller device 102 (not shown within FIG. 1).

Figure 2:
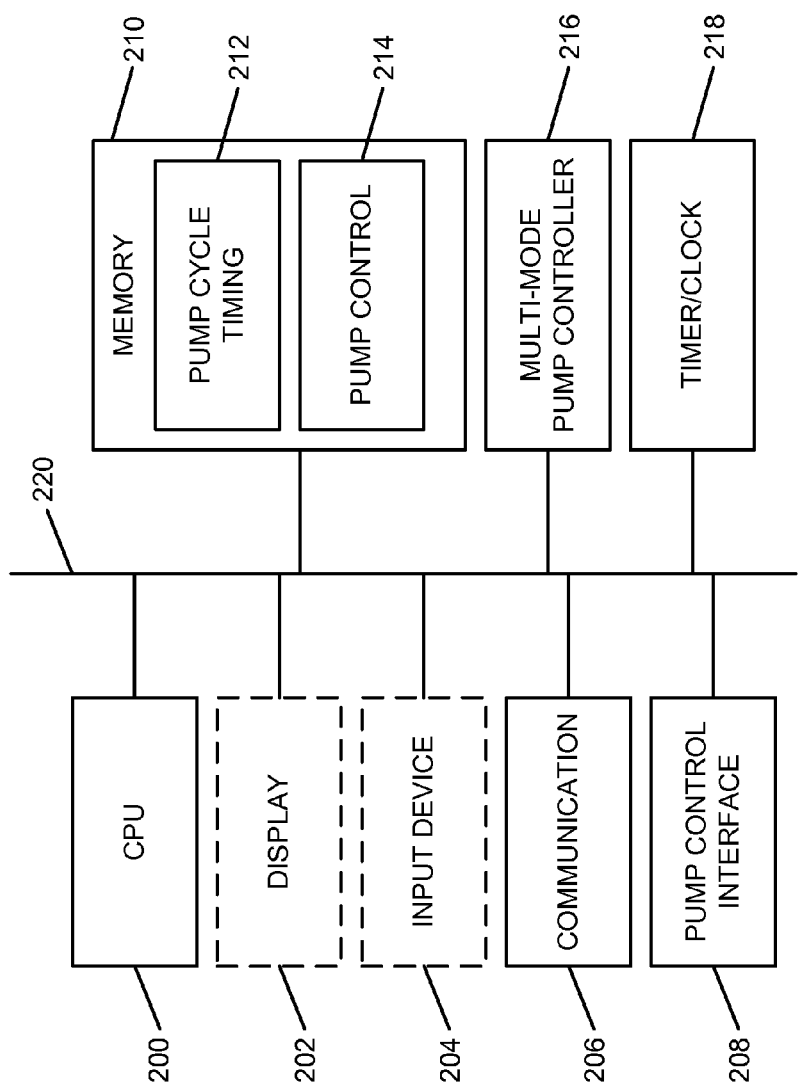
FIG. 2 is a block diagram of an example of an implementation of the pump controller device of FIG. 1 capable of performing automated time-based multi-mode pump control according to an embodiment of the present subject matter.

FIG. 2 is a block diagram of an example of an implementation of the pump controller device 102 of FIG. 1 capable of performing automated time-based multi-mode pump control. A central processing unit (CPU) 200 provides computer instruction execution, computation, and other capabilities within the pump controller device 102. A display 202 provides visual information to a user of the pump controller device 102 and an input device 204 provides input capabilities for the user.

The display 202 may include any display device, such as a cathode ray tube (CRT), liquid crystal display (LCD), light emitting diode (LED) display, electronic ink displays, projection, touchscreen, one or more individual light emitting diode(s) (LEDs), or other display element or panel. The input device 204 may include a computer keyboard, a keypad, a mouse, a pen, a joystick, dip switches, or any other type of input device by which the user may interact with and respond to information on the display 202.

It should be noted that the display 202 and the input device 204 are illustrated with a dashed-line representation within FIG. 2 to indicate that they may be optional components for the pump controller device 102 for certain implementations. Accordingly, the pump controller device 102 may operate as a completely automated embedded device without direct user configurability or feedback. However, the pump controller device 102 may also provide user feedback and configurability via the display 202 and the input device 204, respectively.

A communication module 206 provides interconnection capabilities that allow the pump controller device 102 to communicate with other modules within the system 100 (e.g., other pump controller devices, configuration devices, etc.). The communication module 206 may include any electrical, protocol, and protocol conversion capabilities useable to provide the interconnection capabilities.

A pump control interface module 208 interfaces with and provides hardware-level connectivity to one or more pumps, such as the pump 104 within FIG. 1. The pump control interface module 208 may receive inputs from one or more level sensing devices, such as the high float 108 and the low float 110 of FIG. 1. The pump control interface module 208 also controls power and operating speed for one or more motors associated with one or more pumps, such as the pump 104 within FIG. 1. The inputs received from the level sensing device(s) may be processed as described above and in more detail below to selectively cycle power to and to control the operating speed for the pump 104. As such, the pump control interface module 208 controls on/off cycles based upon fluid level inputs.

A memory 210 includes a pump cycle timing storage area 212 that stores pump monitoring measurements for the pump controller device 102. The pump monitoring measurements may include on/off cycle times, on/off cycle counts, and other pump monitoring measurements and calculations as appropriate for a given implementation.

A pump control storage area 214 stores pump control information from one or more pumps, such as the pump 104. The stored pump control information may include current settings, such as pump operating speed, determined minimum and/or maximum pump speeds, and other pump control information as appropriate for a given implementation. As described above, a default initial operating speed for a pump may be considered one hundred percent (100%) of a variable operating speed range for the respective pump.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A multi-mode pump controller module 216 is also illustrated. The multi-mode pump controller module 216 provides processing capabilities for the pump controller device 102, as described above and in more detail below. The multi-mode pump controller module 216 implements the automated time-based multi-mode pump control of the pump controller device 102. The multi-mode pump controller module 216 processes fluid level inputs received from the pump control interface module 208, and controls the pump control interface module 208 to cycle power and adjust speed for one or more pumps. The multi-mode pump controller module 216 monitors the on/off cycles for the respective pump(s) and processes this monitored information to determine an appropriate operating mode (e.g., sub-pump mode or continuous pumping mode) and appropriate operating speed when the respective pump is operated within the continuous pumping mode.

It should also be noted that the multi-mode pump controller module 216 may form a portion of other circuitry described without departure from the scope of the present subject matter. Further, the multi-mode pump controller module 216 may alternatively be implemented as an application stored within the memory 210. In such an implementation, the multi-mode pump controller module 216 may include instructions executed by the CPU 200 for performing the functionality described herein. The CPU 200 may execute these instructions to provide the processing capabilities described above and in more detail below for the pump controller device 102. The multi-mode pump controller module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, such as on/off cycle times, as described above and in more detail below. As such, the multi-mode pump controller module 216 may utilize information derived from the timer/clock module 218 for information processing activities, such as the automated time-based multi-mode pump control.

The CPU 200, the display 202, the input device 204, the communication module 206, the pump control interface module 208, the memory 210, the multi-mode pump controller module 216, and the timer/clock module 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the pump controller device 102 is illustrated with and has certain components described, other modules and components may be associated with the pump controller device 102 without departure from the scope of the present subject matter. Additionally, it should be noted that, while the pump controller device 102 is described as a single device for ease of illustration purposes, the components within the pump controller device 102 may be co-located or distributed and interconnected via a network without departure from the scope of the present subject matter. For a distributed arrangement, the display 202 and the input device 204 may be located at a kiosk or other location, while the CPU 200 and memory 210 may be located at a local or remote server. Many other possible arrangements for components of the pump controller device 102 are possible and all are considered within the scope of the present subject matter. Accordingly, the pump controller device 102 may take many forms and may be associated with many platforms.

FIG. 3A through FIG. 5C described below represent example processes that may be executed by devices, such as the pump controller device 102, to perform the automated time-based multi-mode pump control associated with the present subject matter.

Figure 3A:
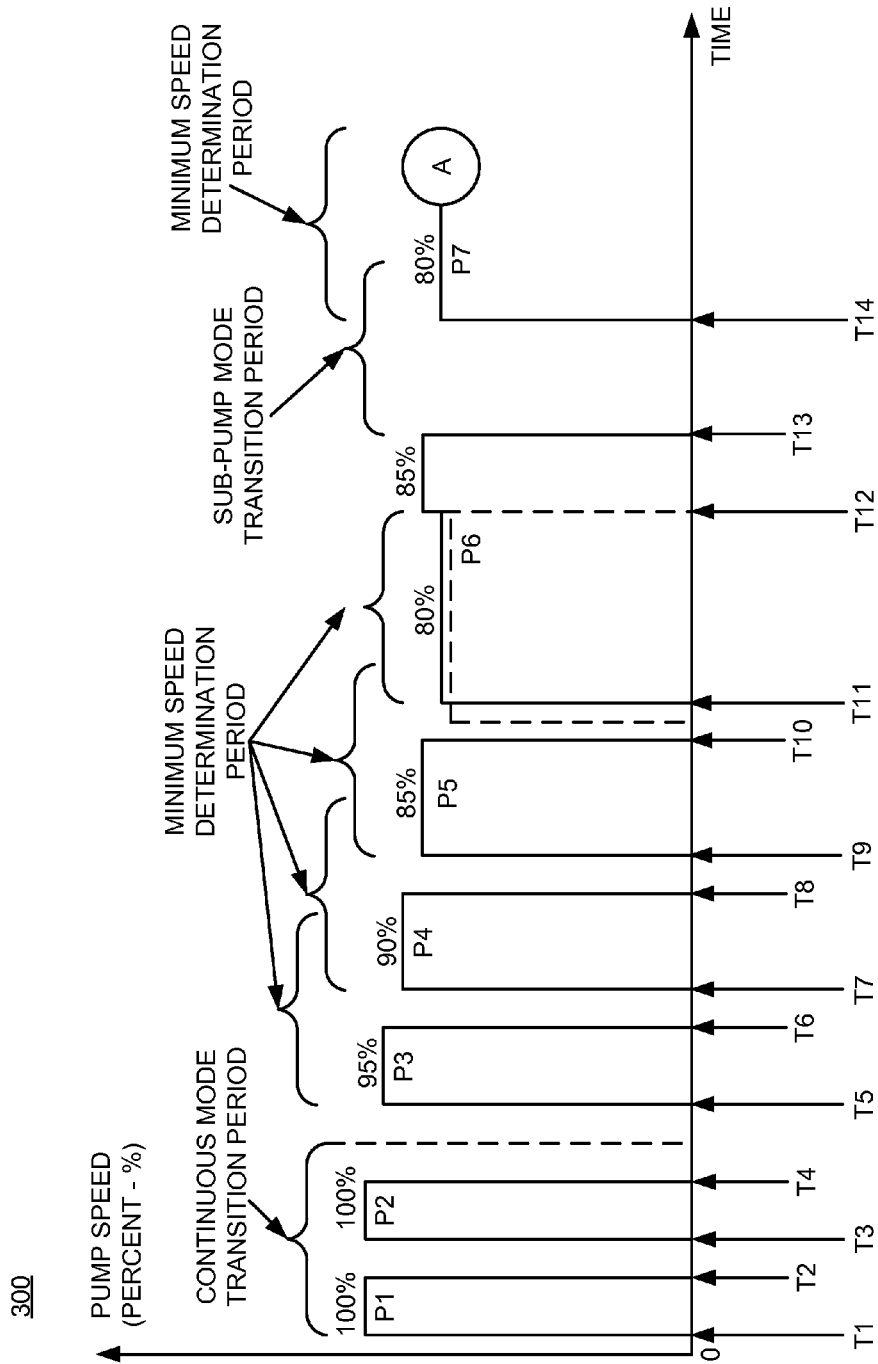
FIG. 3A illustrates initial processing within a time sequence chart of an example of an implementation of pump controls for automated time-based multi-mode pump control according to an embodiment of the present subject matter.
Figure 3B:
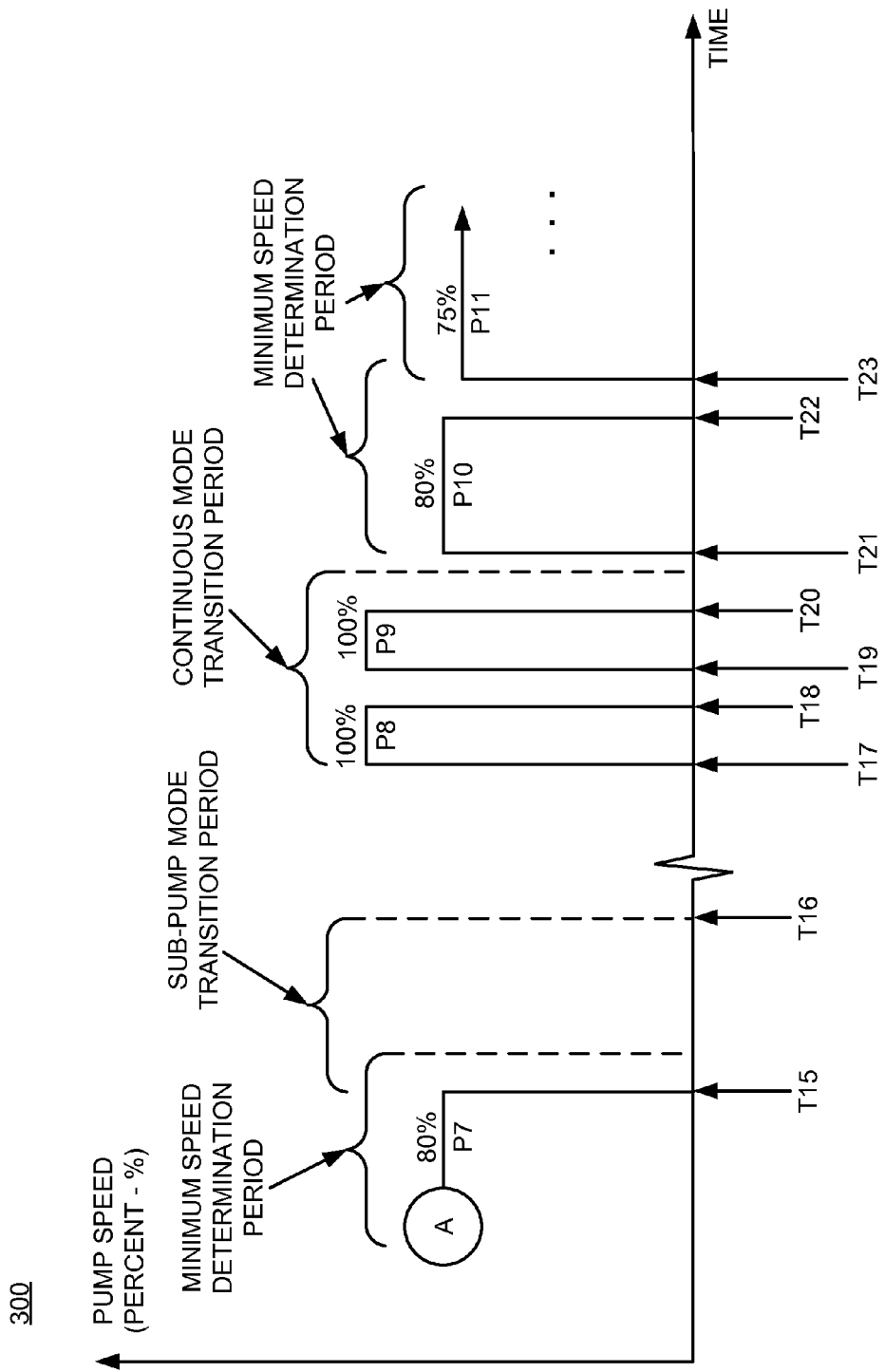
FIG. 3B illustrates additional processing within a time sequence chart of an example of an implementation of pump controls for automated time-based multi-mode pump control according to an embodiment of the present subject matter.

FIGS. 3A-3B illustrate a time sequence chart of an example of an implementation of pump controls 300 for automated time-based multi-mode pump control. The pump controls 300 represent pump control inputs and pump control outputs for monitoring and controlling actuation and the operating mode of a variable-speed pump, such as the pump 104, according to the automated time-based multi-mode pump control described herein. The pump controls 300 may be implemented by processes, such as the processes described below in association with FIG. 4 and FIGS. 5A-5C.

The pump controls 300 may be generated by devices, such as the pump controller device 102. The example pump controls 300 may be generated by modules, such as the multi-mode pump controller module 216 and/or by the CPU 200, associated with such devices utilizing a pump control interface, such as the pump control interface 208. Many other variations on the example pump controls 300 are possible and all are considered within the scope of the present subject matter.

Within FIG. 3A and FIG. 3B, a vertical axis represents pump speed output controls as a percent of the variable pump speed range for the pump 104 and a horizontal axis represents time beginning from zero (0) within the present example. It should be noted that the respective values of the pump controls 300 described below within FIG. 3A and FIG. 3B are not to scale.

FIG. 3A illustrates initial processing associated with the example pump controls 300 where, after a transition to the continuous pumping mode from the sub-pump mode, there is not a pump operating mode reset back to the sub-pump mode. For purposes of the present example, the pump 104 is initially configured in the sub-pump mode of operation and it is assumed that the initial pump speed for the pump 104 is one hundred percent (100%) of the available operating speed range of the pump 104.

It should additionally be noted that, within the present example, an initial configured "continuous mode transition time period" is established, as represented by the bracket above the first two pulses within FIG. 3A. This configured continuous mode transition time period may be set to any suitable time period as appropriate for a given implementation. For example, a period of minutes, hours, or other time period may be used. Further, a configured "on/off continuous mode transition count" is set to two (2) on/off cycles for the pump 104 during the configured continuous mode transition time period. For purposes of the present example, the pump controller device 102 will transition the pump 104 from the sub-pump mode to the continuous pumping mode if the configured on/off continuous mode transition count is met or exceeded during the configured continuous mode transition time period (e.g., on/off transitions during continuous mode transition time period is greater than or equal to the configured continuous mode on/off transition count).

As such, a continuous mode threshold counter of the on/off transitions of the pump 104 over time provides the information useable to determine whether to transition the pump 104 from the sub-pump mode to the continuous pumping mode. It should be noted, however, that while the present example counts both on and off transitions collectively, only "on" transitions or "off" transitions may alternatively be counted as appropriate for a given implementation.

Returning to the example of FIG. 3A, at a time T1, again observing that the pump 104 is being operated in the sub-pump operating mode, a high fluid signal from the high float 108 is detected by the pump controller device 102 and the pump controller device 102 turns the pump 104 on at one hundred percent (100%) of its variable speed range, as represented by a rising edge of a pulse P1. The pump controller device 102 also starts a first timer, such as a timer of the timer/clock module 218, to begin measuring time for the continuous mode transition time period, again as represented by the bracket above the first two pulses within FIG. 3A. As described above, if the continuous mode on/off transition count (i.e., currently configured to a count of two (2) within the present example) represented by the continuous mode threshold counter is met or exceeded prior to expiration of the continuous mode transition time period, the pump controller device 102 will transition the pump 104 from the sub-pump operating mode to the continuous pumping mode of operation. At a time T2, a low fluid signal from the low float 110 is detected by the pump controller device 102 and the pump controller device 102 turns the pump 104 off, as represented by a falling edge of the pulse P1. The pump controller device 102 monitors this on/off cycle of the pump 104 and increments the continuous mode threshold counter from an initial value of zero (0) to a value of one (1) to indicate that one on/off pump cycle has occurred during the continuous mode transition time period.

Similarly, at a time T3, another high fluid signal from the high float 108 is detected by the pump controller device 102 and the pump controller device 102 turns the pump 104 on at one hundred percent (100%) of its variable speed range, as represented by a rising edge of a pulse P2. It should be noted that this "on" transition for the pump 104 occurs prior to expiration of the continuous mode transition time period. At a time T4, another low fluid signal from the low float 110 is detected by the pump controller device 102 and the pump controller device 102 turns the pump 104 off, as represented by a falling edge of the pulse P2. The pump controller device 102 monitors this on/off cycle of the pump 104 and increments the continuous mode threshold counter to a value of two (2).

As such, the configured continuous mode on/off transition count represented within the continuous mode threshold counter with the value of two (2) has been reached prior to expiration of the configured continuous mode transition time period. As such, the pump controller device 102 transitions the operating mode of the pump 104 from the sub-pump mode to the continuous pumping mode for subsequent on/off cycles and begins iteratively decreasing the operating speed of the pump 104 over time to cause the pump 104 to run continuously as long as possible at a determined minimum operating speed. The pump controller device 102 configures the initial decreased-speed operation value to be at ninety five percent (95%) of the variable speed range for the pump 104. The transition of the operating mode of the pump 104 from the sub-pump mode to the continuous pumping mode also clears the continuous mode threshold counter value within the present example.

As can be seen from FIG. 3A, at a time T5, another high fluid signal from the high float 108 is detected by the pump controller device 102 and the pump controller device 102 turns the pump 104 on at ninety five percent (95%) of its variable speed range, as represented by a rising edge of a pulse P3. The pump controller device 102 also starts another timer, such as a timer of the timer/clock module 218, to begin measuring time for a minimum speed determination time period. For purposes of the present example, if the minimum speed determination time period elapses and the pump 104 is still on/operating, the pump controller device 102 determines that the pump 104 is not effectively evacuating the fluid from the enclosure 106. In such a situation, the pump controller device 102 determines that the current operating speed is the configurable minimum speed for the pump 104 under the current operating conditions, but begins processing to increment the operating speed of the pump 104 to cause the pump 104 to remove the fluid from the enclosure 106. As can be seen from FIG. 3A, at a time T6, another low fluid signal from the low float 110 is detected by the pump controller device 102 and the pump controller device 102 turns the pump 104 off, as represented by a falling edge of the pulse P3.

The pump controller device 102 monitors this on/off cycle of the pump 104 and determines, as can be seen from FIG. 3A, that the duration of the on/off cycle (e.g., the pulse P3) was longer than the duration of either of the prior on/off cycles (e.g., the pulses P1 and P2). It is additionally noted that the low fluid signal from the low float 110 is detected by the pump controller device 102 prior to expiration of the configured minimum speed determination time period that began at time T5. As such, the pump controller device 102 determines that the minimum operating speed for the pump 104 has not been reached. The pump controller device 102 again decreases the configured decreased-speed operation value to be ninety percent (90%) of the variable speed range for the pump 104.

As can be seen from FIG. 3A, at a time T7, another high fluid signal from the high float 108 is detected by the pump controller device 102 and the pump controller device 102 turns the pump 104 on at ninety percent (90%) of its variable speed range, as represented by a rising edge of a pulse P4. The pump controller device 102 also starts another timer, such as a timer of the timer/clock module 218, to begin measuring time for the minimum speed determination time period again and operates as described above and in more detail below. At a time T8, another low fluid signal from the low float 110 is detected by the pump controller device 102 and the pump controller device 102 turns the pump 104 off, as represented by a falling edge of the pulse P4.

The pump controller device 102 monitors this on/off cycle of the pump 104 and determines, as can be seen from FIG. 3A, that the duration of the on/off cycle (e.g., the pulse P4) was longer than the duration of the prior on/off cycle (e.g., the pulse P3). It is again noted that the low fluid signal from the low float 110 is detected by the pump controller device 102 prior to expiration of the configured minimum speed determination time period that began at time T7. As such, the pump controller device 102 determines that the minimum operating speed for the pump 104 has not been reached. The pump controller device 102 again decreases the configured decreased-speed operation value to be eighty five percent (85%) of the variable speed range for the pump 104.

As again can be seen from FIG. 3A, at a time T9, another high fluid signal from the high float 108 is detected by the pump controller device 102 and the pump controller device 102 turns the pump 104 on at eighty five percent (85%) of its variable speed range, as represented by a rising edge of a pulse P5. The pump controller device 102 also starts another timer, such as a timer of the timer/clock module 218, to begin measuring time for the minimum speed determination time period again and operates as described above and in more detail below. At a time T10, another low fluid signal from the low float 110 is detected by the pump controller device 102 and the pump controller device 102 turns the pump 104 off, as represented by a falling edge of the pulse P5.

The pump controller device 102 monitors this on/off cycle of the pump 104 and determines, as can be seen from FIG. 3A, that the duration of the on/off cycle (e.g., the pulse P5) was longer than the duration of the prior on/off cycle (e.g., the pulse P4). It is again noted that the low fluid signal from the low float 110 is detected by the pump controller device 102 prior to expiration of the configured minimum speed determination time period that began at time T9. As such, the pump controller device 102 determines that the minimum operating speed for the pump 104 has not been reached. The pump controller device 102 again decreases the configured decreased-speed operation value to be eighty percent (80%) of the variable speed range for the pump 104.

It should be noted, as described above, that the timing information obtained from the on and/or off cycles may be used to adjust mechanical set points (e.g., the mechanical set points of the high float 108 and the low float 110). As such, based upon the time intervals between the times T6 and T7 and between the times T8 and T9 (which are equal within the present example), the processing may be configured to predict a next high fluid signal (e.g., at the time T11 described further below). For example, a next high fluid signal may be estimated to arrive at a time equivalent to an average of the previous intervals of time between the times T6 and T7 and between the times T8 and T9 (which again are equal within the present example). The processing may then adjust the pump on time to a time slightly before a predicted/estimated next high fluid signal as illustrated by the dashed vertical line after the time T10 (prior to the time T11) within FIG. 3A. The processing may also slightly decrease the next operating decreased-speed increment as illustrated by the dashed horizontal line below the eighty percent (80%) horizontal pulse line of the pulse P6 within FIG. 3A attached to the vertical dashed line described above. As such, a longer continuous pumping cycle may be achieved and mechanical presets may be adjusted by use of time measurements alone. Other times and timers may be adjusted as appropriate for a given implementation.

As again can be seen from FIG. 3A, at a time T11, another high fluid signal from the high float 108 is detected by the pump controller device 102 and the pump controller device 102 turns the pump 104 on at eighty percent (80%) of its variable speed range of the pump 104, as represented by a rising edge of an initial portion of a pulse P6. The pump controller device 102 also starts another timer, such as a timer of the timer/clock module 218, to begin measuring time for the minimum speed determination time period again and operates as described above and in more detail below. It should be noted that, while the present examples illustrate certain inputs and control processing, other variations are possible. For example, if another high float signal (e.g., an "on" float) is triggered when the pump 104 is running in the continuous pumping mode, this may be considered as another indication that the pump 104 is being controlled to run too slowly and that it is not evacuating the liquid fast enough. The inverse is also true for other applications, such as where a minimum amount of fluid is to be maintained, such as within a tank. In such an implementation, if a low float signal (e.g., an "off" float) is triggered, the pump 104 may not be running fast enough to keep a tank or other structure filled to meet demand, and such a signal may provide an indication to speed up the motor that is driving the pump 104. As such, again, many alternatives to the processing described in association with the present examples are possible and all are considered within the scope of the present subject matter.

In this stage of processing of the present example, at a time T12, the pump controller device 102 determines that the configured minimum speed determination time period has expired without detecting another low fluid signal from the low float 110. As described above, such a situation may be caused, for example, where an influx of fluid into the enclosure 106 is greater than a capacity of the pump 104 to effectively remove the fluid from the enclosure 106 at the currently-configured speed of operation of the pump 104. Additionally, such a situation indicates that a minimum operating speed for the current fluid influx conditions has been reached. Accordingly, the pump controller device 102 increments/increases the configured decreased-speed operation value of the pump 104 to be eighty five percent (85%) of the variable speed range for the pump 104, which is the last value at which the pump 104 effectively removed the incoming fluid from the enclosure 106. The pump controller device 102 increases the current pump operating speed to operate at eighty five percent (85%) of the variable speed range for the pump 104, as represented by a second rising edge of the pulse P6. It should be noted that the pump controller device 102 also starts another timer, such as a timer of the timer/clock module 218, to again begin measuring time for the minimum speed determination time period at the time T12. However, a representation of this time period is omitted from FIG. 3A to avoid crowding within the drawing.

As again can be seen from FIG. 3A, at a time T13, another low fluid signal from the low float 110 is detected by the pump controller device 102 and the pump controller device 102 turns the pump 104 off, as represented by a falling edge of the pulse P6. As such, at the current operating speed, the pump 104 has effectively removed sufficient fluid from the enclosure 106, which indicates that the current operating speed is sufficient under the current fluid influx conditions. Within the present example, the pump controller device 102 configures the minimum speed operation value of the pump 104 for the current fluid influx conditions to be eighty percent (80%) of the variable speed range for the pump 104. It should be noted, however, that a value of eighty five percent (85%) of the variable speed range for the pump 104 may alternatively be utilized as the configured minimum speed operating value for the pump 104. Additionally, it should be noted that different operating conditions (e.g., different fluid influx rates) will result in different configured minimum speeds of operation for the pump 104.

At the time T13, the pump controller module also starts another timer, such as a timer of the timer/clock module 218, to begin measuring time for a sub-pump mode transition time period. The pump controller device 102 monitors a time duration after the falling edge of the pulse P6 and compares that time duration to the configured sub-pump mode transition time period. The configured sub-pump mode transition time period may be used to determine a period of inactivity of the pump 104 that is sufficient in duration to transition the pump 104 back to the sub-pump operating mode, and may be set to any duration of time appropriate for a given implementation. If the sub-pump mode transition time period expires without another high fluid signal from the high float 108 being detected by the pump controller device 102, the pump controller device 102 may revert the pump 104 to operate once again within the sub-pump mode.

It should be noted that the sub-pump mode transition time period is not shown within the present example to be configured in association with the time T6, T8, and T10 described above to avoid crowding within the drawing. However, the sub-pump mode transition time period may be configured and monitored in association with each such event as appropriate for a given implementation. Alternatively, the sub-pump mode transition time period may be configured and monitored in association a determination of a minimum operating speed determination as described within the present example.

As can be seen from FIG. 3A, at a time T14, another high fluid signal from the high float 108 is detected by the pump controller device 102 and the pump controller device 102 turns the pump 104 on at eighty percent (80%) of its variable speed range of the pump 104, as represented by a rising edge of a pulse P7. As such, within the current stage of the present example, the configured sub-pump mode transition time period has not expired prior to detecting the high fluid signal from the high float 108. As such, the pump controller device 102 keeps the pump 104 operating within the continuous pumping mode of operation. Additionally, as described above, eighty percent (80%) of its variable speed range of the pump 104 is the current configured minimum speed operating value for the pump 104.

It should be noted that at the rising edge the pulse P7 the pump controller device 102 again restarts monitoring to determine whether the minimum speed determination period has expired. As such, at the time T14, the pump controller device 102 also starts another timer, such as a timer of the timer/clock module 218, to again begin measuring time for the minimum speed determination time period and operates as described above and in more detail below. Within the present example, it is assumed that this time period for the pulse P7 does not expire, though again it is noted that the drawings within FIG. 3A and FIG. 3B are not to scale. The example pump controls 300 continues with the processing shown and described in association with FIG. 3B.

FIG. 3B illustrates additional processing associated with the example pump controls 300 for automated time-based multi-mode pump control where there is a pump operating mode reset back to the sub-pump mode after a transition to the continuous pumping mode. The pulse P7 described in association with FIG. 3A is shown to be continuing from the circle letter "A" and the operating speed of the pump 104 is shown to be continuing at eighty percent (80%) of its variable speed range of the pump 104.

For purposes of the present example, it is assumed that the pump 104 effectively removes the fluid from the enclosure 106 and that at a time T15 another low fluid signal from the low float 110 is detected prior to expiration of the configured minimum speed determination time period, as represented by a falling edge of the pulse P7. The pump controller device 102 again begins monitoring time to determine whether the sub pump mode transition period has expired at the falling edge of the pulse P7. As such, the pump controller device 102 starts another timer, such as a timer of the timer/clock module 218, to begin measuring time for the sub-pump mode transition time period.

As can be seen from FIG. 3B, another high fluid signal from the high float 108 is not detected prior to expiration of the configured sub-pump mode transition time period at a time T16. As such, the pump controller device 102 determines that fluid pumping requirements are currently low (e.g., such as a seasonal dry period) and resets the operating mode of the pump 104 to the sub-pump mode of operation.

At some later time, such as the beginning of another seasonal rainy period, at a time T17, another high fluid signal from the high float 108 is detected by the pump controller device 102 and the pump controller device 102 turns the pump 104 on at one hundred percent (100%) of its variable speed range, as represented by a rising edge of a pulse P8. At a time T18, another low fluid signal from the low float 110 is detected by the pump controller device 102 and the pump controller device 102 turns the pump 104 off, as represented by a falling edge of the pulse P8. The pump controller device 102 again monitors this on/off cycle of the pump 104 and increments the continuous mode threshold counter from a value of zero (0) to a value of one (1) to indicate that one on/off pump cycle has occurred during the continuous mode transition time period.

Similarly, at a time T19, another high fluid signal from the high float 108 is detected by the pump controller device 102 and the pump controller device 102 turns the pump 104 on at one hundred percent (100%) of its variable speed range, as represented by a rising edge of a pulse P9. It should be noted that this "on" transition for the pump 104 occurs prior to expiration of the continuous mode transition time period. At a time T20, another low fluid signal from the low float 110 is detected by the pump controller device 102 and the pump controller device 102 turns the pump 104 off, as represented by a falling edge of the pulse P9. The pump controller device 102 monitors this on/off cycle of the pump 104 and increments the continuous mode threshold counter to a value of two (2).

As such, as with the pulses P1 and P2 described above in association with FIG. 3A, the configured continuous mode on/off transition count represented within the continuous mode threshold counter with the value of two (2) has been reached prior to expiration of the configured continuous mode transition time period. As such, the pump controller device 102 transitions the operating mode of the pump 104 from the sub-pump mode to the continuous pumping mode for subsequent on/off cycles as described above. The transition of the operating mode of the pump 104 from the sub-pump mode to the continuous pumping mode also clears the continuous mode threshold counter value within the present example.

However, at this stage of the present example, because a previously-determined minimum operating speed for the pump 104 has been configured by the pump controller device 102, the pump controller device 102 may utilize this configured and determined minimum operating speed for subsequent continuous mode operation of the pump 104. As such, at a time T21, another high fluid signal from the high float 108 is detected by the pump controller device 102 and the pump controller device 102 turns the pump 104 on at the configured minimum operating speed of eighty percent (80%) of the variable speed range of the pump 104, as represented by a rising edge of a pulse P10. The rising edge of the pulse P10 also begins monitoring by the pump controller device 102 to determine whether the minimum speed determination period expires prior to detecting a low fluid signal from the low float 110. The pump controller device 102 again starts another timer, such as a timer of the timer/clock module 218, to begin measuring time for a minimum speed determination time period.

For purposes of the present example, it is assumed that the influx of fluid into the enclosure 106 is different from the time period during which the minimum operating speed for the pump 104 was determined and configured. As such, it is assumed that the pump 104 effectively removes fluid from the enclosure 106 at a rate higher than the fluid influx rate and that the minimum speed determination period does not expire prior to detecting a low fluid signal from the low float 110. Accordingly, at a time T22, another low fluid signal from the low float 110 is detected by the pump controller device 102 and the pump controller device 102 turns the pump 104 off, as represented by a falling edge of the pulse P10. It is additionally noted that the low fluid signal from the low float 110 is detected by the pump controller device 102 prior to expiration of the configured minimum speed determination time period that began at time T21. As such, the pump controller device 102 determines that the minimum operating speed for the pump 104 has not been reached for the current fluid influx conditions.

Within this stage of the present example, because the pump 104 effectively removed fluid from the enclosure 106 at a rate higher than the fluid influx rate, the pump controller device 102 may again begin iteratively decreasing the operating speed of the pump 104 over time to cause the pump 104 to run continuously as long as possible at a determined minimum operating speed. The pump controller device 102 configures the decreased-speed operation value to be at seventy five percent (75%) of the variable speed range for the pump 104.

As again can be seen from FIG. 3B, at a time T23, another high fluid signal from the high float 108 is detected by the pump controller device 102 and the pump controller device 102 turns the pump 104 on at seventy five percent (75%) of its variable speed range of the pump 104, as represented by a rising edge of a pulse P11. The rising edge of the pulse P11 also begins monitoring by the pump controller device 102 to determine whether the minimum speed determination time period expires prior to detecting a low fluid signal from the low float 110. The pump controller device 102 again starts another timer, such as a timer of the timer/clock module 218, to begin measuring time for a minimum speed determination time period.

The ellipsis dots within FIG. 3B show that the processing may continue. For example, if another low fluid signal from the low float 110 is detected prior to expiration of the minimum speed determination time period, the pump controller device 102 may again begin iteratively reducing the operating speed based upon the current operating conditions (e.g., current fluid influx rate). Alternatively, if the minimum speed determination time period expires prior to another low fluid signal from the low float 110 being detected, the pump controller device 102 may configure the current operating speed as the minimum operating speed for the current operating conditions and incrementally increase the operating speed to cause the fluid to be removed from the enclosure 106 at a rate higher than the current fluid influx rate.

Accordingly, as described above, the pump controller device 102 utilizes only time and on/off cycles of the pump 104 to determine which of two operating modes to configure for operation of the pump 104. The sub-pump operating mode is selected for lower flow periods and the continuous pumping mode is selected for higher flow periods. During the continuous pumping mode, the operating speed of the pump 104 is incrementally decreased to cause the pump 104 to run as long as possible while still effectively removing fluid from the respective enclosure. No pressure transducers are used. Only time and on/off transitions of the pump 104 are used. As such, the example pump controls 300 may effectively decrease initial pumping system installation costs and may improve pumping system life while reducing pumping system maintenance costs. Many variations on the processing described above are possible and all are considered within the scope of the present subject matter.

Figure 4:
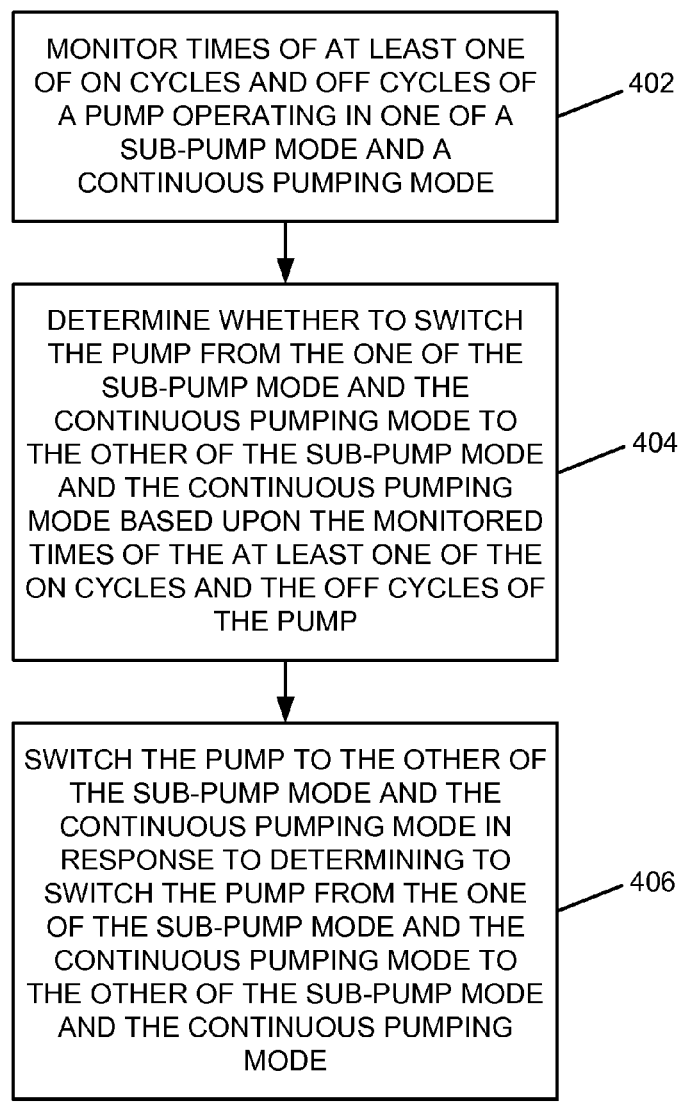
FIG. 4 is a flow chart of an example of an implementation of a process for automated time-based multi-mode pump control according to an embodiment of the present subject matter.
Figure 5A:
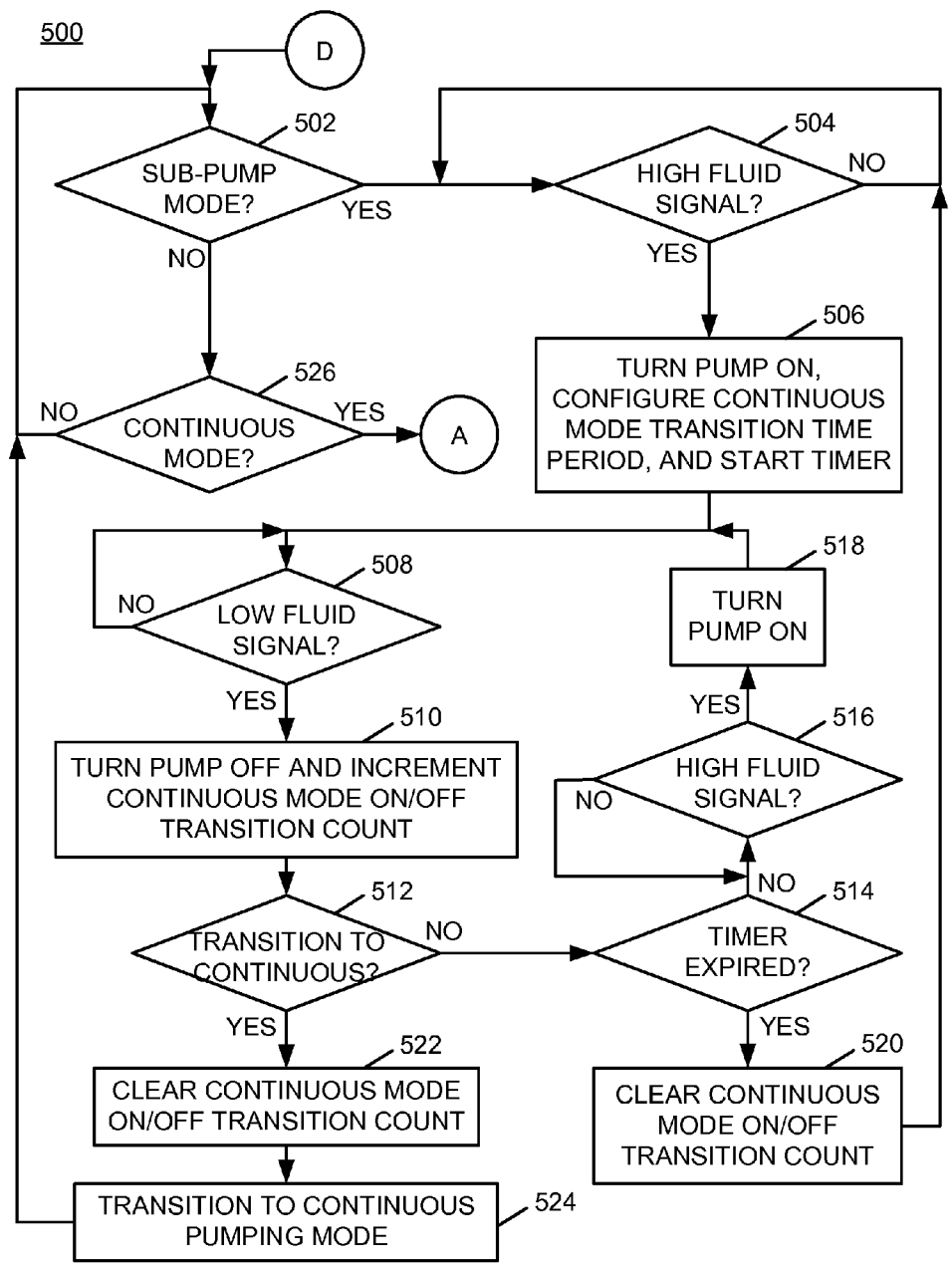
FIG. 5A is a flow chart of an example of an implementation of initial processing within a process for automated time-based multi-mode pump control according to an embodiment of the present subject matter.
Figure 5B:
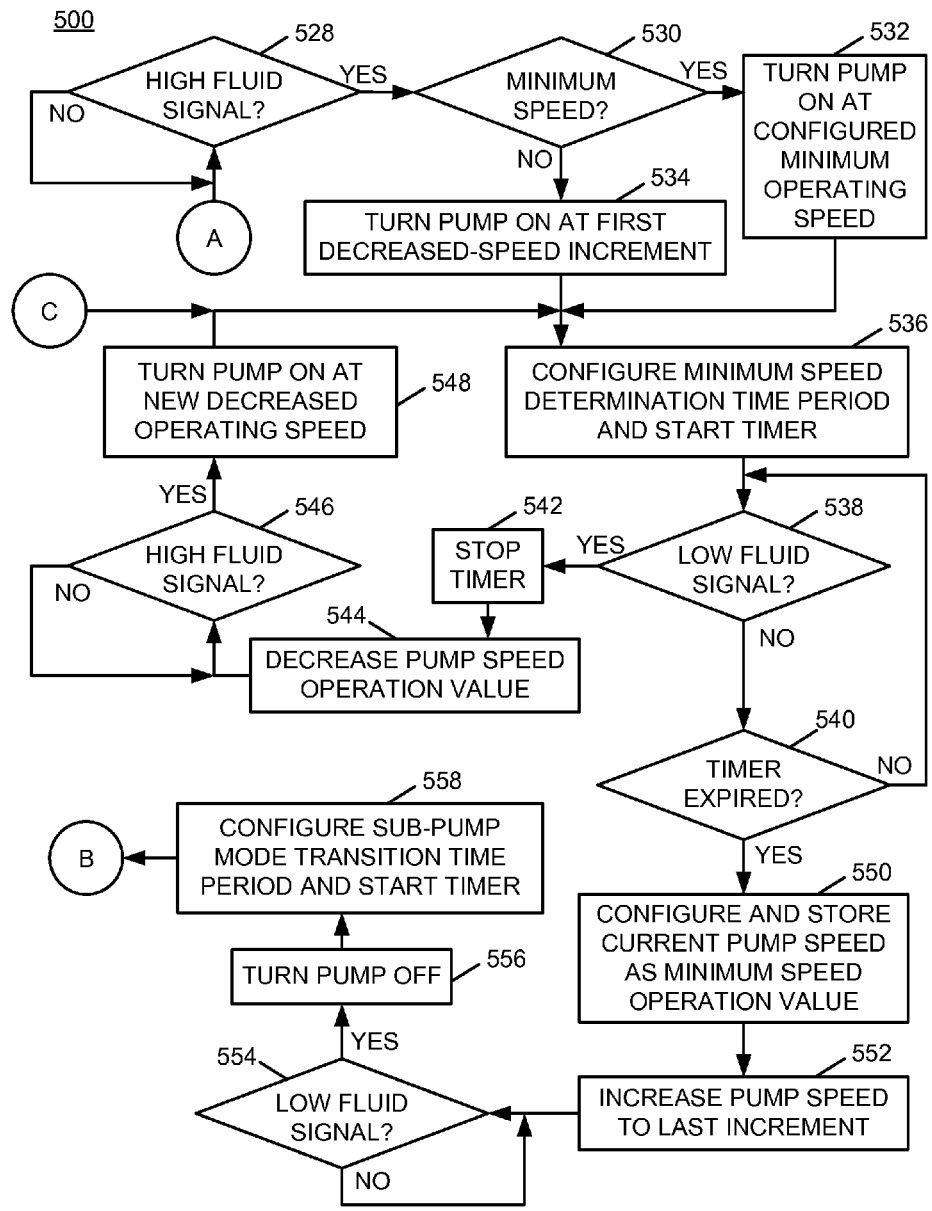
FIG. 5B is a flow chart of an example of an implementation of additional processing within a process for automated time-based multi-mode pump control according to an embodiment of the present subject matter.
Figure 5C:
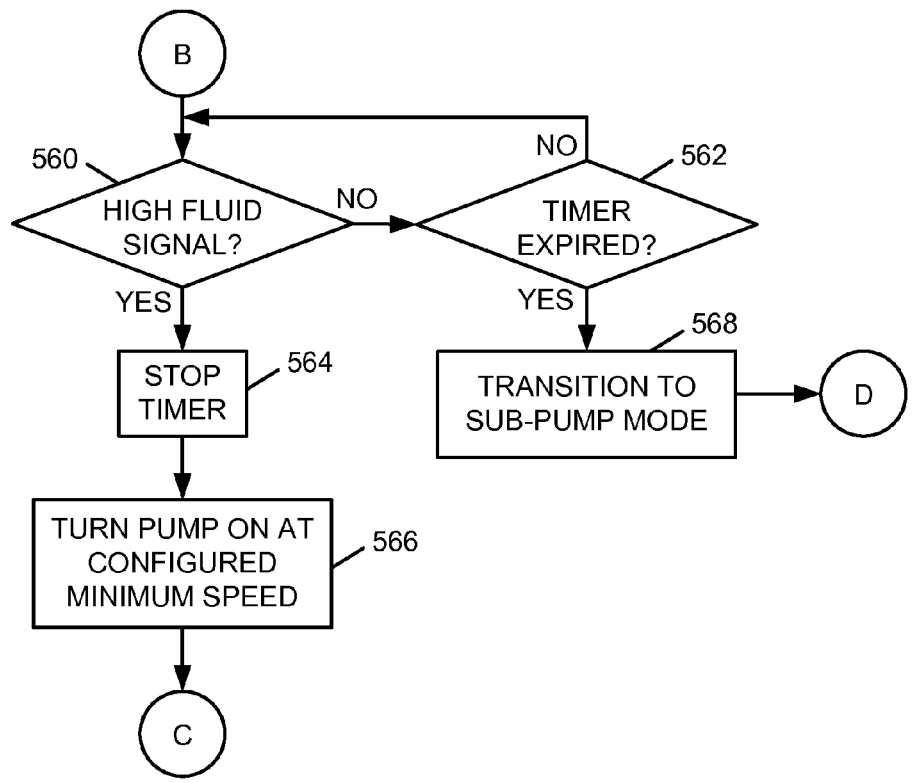
FIG. 5C is a flow chart of an example of an implementation of additional processing within a process for automated time-based multi-mode pump control according to an embodiment of the present subject matter.

FIG. 4 through FIG. 5C described below represent example processes that may be executed by devices, such as the pump controller device 102, to perform the automated time-based multi-mode pump control associated with the present subject matter. Many other variations on the example processes are possible and all are considered within the scope of the present subject matter. The example processes may be performed by modules, such as the multi-mode pump controller module 216 and/or executed by the CPU 200, associated with such devices. It should be noted that time out procedures other than time measurements associated with measured time periods and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for automated time-based multi-mode pump control. At block 402, the process 400 monitors times of at least one of on cycles and off cycles of a pump operating in one of a sub-pump mode and a continuous pumping mode. At block 404, the process 400 determines whether to switch the pump from the one of the sub-pump mode and the continuous pumping mode to the other of the sub-pump mode and the continuous pumping mode based upon the monitored times of the at least one of the on cycles and the off cycles of the pump. At block 406, the process 400 switches the pump to the other of the sub-pump mode and the continuous pumping mode in response to determining to switch the pump from the one of the sub-pump mode and the continuous pumping mode to the other of the sub-pump mode and the continuous pumping mode.

FIGS. 5A-5C illustrate a flow chart of an example of an implementation of process 500 for automated time-based multi-mode pump control. FIG. 5A illustrates initial processing within the process 500. For purposes of the present example, it is assumed that one or more pumps under control, such as the pump 104, are initially configured in the sub-pump mode. However, pumps under control may alternatively be initially configured in the continuous pumping mode as appropriate for a given implementation. It is additionally assumed for purposes of the present example, that the pump(s) under control are configured to initially operate at one hundred percent (100%) of the variable speed range and that they are capable of effectively removing the fluid to be pumped from the respective enclosure while operating within the sub-pump mode at that speed. Alternative processing may be used under different conditions as appropriate for a given implementation.

At decision point 502, the process 500 makes a determination as to whether the operating mode of a pump under control is in the sub-pump mode. As described above, for purposes of the present example, it is assumed that one or more pumps under control are initially configured in the sub-pump mode. As such, in response to determining that the pump is in the sub-pump mode, the process 500 makes a determination at decision point 504 as to whether a high fluid signal, such as from the high float 108, has been detected. In response to determining that a high fluid signal has been detected, the process 500 turns the pump under control on, configures a continuous mode transition time period, and starts a timer to measure the continuous mode transition time at block 506. As described above, the continuous mode transition time period is used to determine when to transition the pump to the continuous pumping mode from the sub-pump mode of operation.

That decision point 508, process 500 makes a determination as to whether a low fluid signal, such as from the low float 110, has been detected. In response to determining that a low fluid signal has been detected, the process 500 turns the pump off and increments a continuous mode on/off transition count at block 510. As described above, the continuous mode threshold count value may be configured to cause a transition to the continuous pumping mode at any count value appropriate for a given implementation.

At decision point 512, the process 500 makes a determination as to whether to transition to the continuous pumping mode. In response to determining that the continuous mode threshold count value for transitioning the pump to the continuous pumping mode has not been reached, and thereby determining not to transition to the continuous pumping mode, the process 500 makes a determination at decision point 514 as to whether the timer set to measure the continuous mode transition time period has expired. In response to determining that the timer has not expired, the process 500 makes a determination at decision point 516 as to whether a high fluid signal has been detected. In response to determining that a high fluid signal has been detected, process 500 again turns the pump on at block 518, returns to decision point 508, and iterates as described above.

Returning to the description of decision point 514, and as described above, in response to determining that the timer for the continuous mode transition time period has expired, the process 500 clears the continuous mode on/off transition count at block 520 and returns to decision point 504 and iterates as described above within the sub-pump mode and configures additional continuous mode transition time periods as appropriate for the current pumping conditions.

Returning to the description of decision point 512, in response to determining that the continuous mode on/off transition count has been met (e.g., is equal to) the configured continuous mode threshold count, the process 500 clears the continuous mode on/off transition count at block 522 and transitions the pump under control to the continuous pumping mode at block 524. The process 500 returns to decision point 502.

Because the pump has transitioned to the continuous pumping mode, the determination at decision point 502 will be that the pump is not in the sub-pump mode. At decision point 526, the process 500 makes a determination that the pump under control is in the continuous pumping mode. The process 500 then transitions to the processing shown and described in association with FIG. 5B.

FIG. 5B illustrates additional processing associated with the process 500 for automated time-based multi-mode pump control. At decision point 528, process 500 makes determination as to whether a high fluid signal has been detected. In response to determining that a high fluid signal has been detected, the process 500 makes a determination at decision point 530 as to whether a configured minimum operating speed for operating the pump in the continuous pumping mode has been previously established either during initial setup or during a previous continuous pumping mode operation. In response to determining that a configured minimum operating speed has previously been established, the process 500 turns the pump on at the configured minimum operating speed at block 532. Alternatively, at block 534, in response to determining that a configured minimum operating speed has not previously been established, the process 500 turns the pump on at a first decreased-speed increment (e.g., ninety-five percent (95%) as in the example of FIGS. 3A and 3B).

In response to turning the pump on at either block 532 or at block 534, the process 500 configures a minimum speed determination time period and starts a timer at block 536. As described above, the minimum speed determination time period may be used to determine when a minimum operating speed for the pump in the continuous pumping mode has been reached for the current fluid influx conditions.

At decision point 538, the process 500 makes a determination as to whether a low fluid signal has been detected. In response to determining that a low fluid signal has not been detected, the process 500 makes a determination that decision point 540 as to whether the minimum speed determination time period has expired. In response to determining that the minimum speed determination time period has not expired, the process 500 returns to decision point 538 and iterates as described above.

As described above, processing may be implemented to configure a sub-pump mode transition time period in response to any low fluid signal during the continuous pumping mode to determine when to transition back to the sub-pump mode. Processing to configure and measure a sub-pump mode transition time period is omitted from this portion of the drawing to avoid crowding within the drawing. Processing to configure and measure a sub-pump mode transition time period is described in more detail below.

In response to determining at decision point 538 that the low fluid signal has been detected, the process 500 stops the timer at block 542. At block 544, the process 500 decreases the pump speed operating value by one increment (e.g., by five percent (5%). The selected increment may be any value as appropriate for a given implementation.

At decision point 546, process 500 makes a determination as to whether a high fluid signal has been detected. In response to determining that the high fluid signal has been detected, the process 500 turns the pump on the new decreased operating speed at block 548. The process 500 returns to block 536 and iterates as described above.

Returning to the description of decision point 540, in response to determining that the minimum speed determination time period has expired, the process 500 configures and stores the current pump speed as a minimum speed operation value for the pump at block 550. At block 552, the process 500 increases the pump speed to the last higher pump speed increment to evacuate the respective fluid enclosure.

At decision point 554, the process 500 makes a determination as to whether a low fluid signal has been detected. A low fluid signal indicates that the respective fluid enclosure was effectively evacuated (e.g., fluid removed) using the last higher pump speed increment. For purposes of the present example, it is assumed that the last higher pump speed increment does evacuate the respective fluid enclosure or other processing may be implemented to further increase the pump speed as appropriate for a given implementation and fluid influx conditions. As such, in response to determining that the low fluid signal has been detected, a process 500 turns the pump off at block 556.

At block 558, the process 500 configures a sub-pump mode transition time period and starts a timer. The process 500 transitions to the processing shown and described in association with FIG. 5C.

FIG. 5C illustrates additional processing associated with the process 500 for automated time-based multi-mode pump control. At decision point 560, process 500 makes determination as to whether a high fluid signal has been detected. In response to determining that a high fluid signal has not been detected, the process 500 makes a determination at decision point 562 as to whether the timer that is measuring the sub-pump mode transition time period has expired. In response to determining that the sub-pump mode transition time period has not expired, the process 500 returns to decision point 560 and iterates as described above.

In response to determining at decision point 560 that a high fluid signal has been detected, process 500 stops the timer that is measuring the sub-pump mode transition time period at block 564. As described above, it is assumed that a configured minimum speed has been achieved at least by operation of the pump under real-time operating conditions. As such, at block 566, the process 500 turns the pump on at the configured minimum speed. The process 500 returns to FIG. 5B at block 536 to configure a new minimum speed determination time period for the current operating conditions and iterates as described above.

Returning to the description of decision point 562 in FIG. 5C, in response to determining that the sub-pump mode transition time period has expired, the process 500 transitions the pump to the sub-pump mode at block 568. The process 500 returns to the processing described above in association with FIG. 5A at decision point 502 and iterates as described above.

As such, the process 500 transitions a pump between a sub-pump mode and a continuous pumping mode. The process 500 configures mode transition timers to determine when to transition between the two modes. The process 500 transitions the pump from the sub-pump mode to the continuous pumping mode based upon a number of on/off cycles (e.g., seasonal wet conditions) of the pump during a configured continuous mode transition time period. The process 500 transitions the pump from the continuous pumping mode to the sub-pump mode based upon inactivity (e.g., a seasonal dry period) of the pump during a configured sub-pump mode transition time period.

It should be noted that, while the process 500 is described in association with responses based upon mechanical set points, the process 500 may also adjust those mechanical set points based upon time averages of on and/or off cycles during the respective operating modes as described above. Such processing may be utilized, for example, to turn the pump on or off before or after the respective mechanical set points, as appropriate for a given implementation. This additional processing is considered to form a configurable part of the process 500, but is omitted to avoid extensive complexity within the example of FIGS. 5A-5C. It is understood that a person of ordinary skill may implement such averaging and fixed set point adjustments based upon the description herein.

As described above in association with FIG. 1 through FIG. 5C, the example systems and processes provide time-based multi-mode pump control. Many other variations and additional activities associated with time-based multi-mode pump control are possible and all are considered within the scope of the present subject matter.

Those skilled in the art will recognize, upon consideration of the above teachings, that certain of the above examples are based upon use of a programmed processor, such as CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

monitoring, by a pump control unit that operates a variable-speed pump, times of at least one of on cycles and off cycles of the variable-speed pump operating in one of a sub-pump mode in which the pump control unit operates the variable-speed pump at maximum capacity, and a continuous pumping mode in which the pump control unit operates the variable-speed pump at decreasing speeds during successive on cycles and iteratively learns from durations of a series of on/off cycles a combined minimum pump speed and longest continuous pumping duration that effectively pumps a quantity of fluid to be pumped;

determining whether to switch the pump from the one of the sub-pump mode and the continuous pumping mode to the other of the sub-pump mode and the continuous pumping mode based upon the monitored times of the at least one of the on cycles and the off cycles of the pump; and switching, during an off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode.

2. The method of claim 1, further comprising:
iteratively reducing, in response to switching the pump to the continuous pumping mode, an operating speed of the pump during subsequent on/off cycles of the pump; and
determining, for the subsequent on/off cycles of the pump in the continuous pumping mode, whether the combined minimum pump speed and longest continuous pumping duration has been achieved that effectively pumps fluid to a designated low level prior to expiration of a minimum speed determination time period started at a beginning of each subsequent on/off cycle of the pump in the continuous pumping mode.

3. The method of claim 2, where, during any subsequent on/off cycle:
iteratively reducing, in response to switching the pump to the continuous pumping mode, the operating speed of the pump during the subsequent on/off cycles of the pump comprises:
turning the pump on at a currently configured incrementally-decreased pump operating speed in the continuous pumping mode in response to detecting a high fluid signal associated with the pump; and
configuring, in response to turning the pump on at each incrementally-decreased pump operating speed, the minimum speed determination time period; and
determining, for the subsequent on/off cycles of the pump in the continuous pumping mode, whether the combined minimum pump speed and longest continuous pumping duration has been achieved that effectively pumps fluid to the designated low level prior to expiration of the minimum speed determination time period started at the beginning of each subsequent on/off cycle of the pump in the continuous pumping mode comprises:
determining, during operation of the pump at each incrementally-decreased pump operating speed, whether a low fluid signal associated with the pump is detected prior to expiration of the minimum speed determination time period.

4. The method of claim 3, further comprising, during any subsequent on/off cycle:
in response to determining that the low fluid signal associated with the pump is not detected prior to the expiration of any configured minimum speed determination time period:
storing the currently configured incrementally-decreased pump operating speed as a minimum effective pump speed for the pump in the continuous pumping mode; and
in response to determining that the low fluid signal associated with the pump is detected prior to expiration of any configured minimum speed determination time period:
turning the pump off; and
configuring a next incrementally-decreased pump operating speed for a next on/off cycle.

5. The method of claim 1, further comprising:
adjusting one of an electrical preset and a mechanical preset of the pump by predicting a time of a subsequent high fluid signal during the continuous pumping mode; and
turning the pump on at a time prior to the subsequent high fluid signal at an operating speed lower than a previous operating speed based upon the adjusted one of the electrical preset and the mechanical preset of the pump.

6. The method of claim 1, where:
determining whether to switch the pump from the one of the sub-pump mode and the continuous pumping mode to the other of the sub-pump mode and the continuous pumping mode based upon the monitored times of the at least one of the on cycles and the off cycles of the pump comprises:
counting, within the sub-pump mode during a configured continuous mode transition time period, at least one of the on cycles and the off cycles of the pump; and
determining whether a value of the counted at least one of the on cycles and the off cycles of the pump is at least equal to a configured continuous mode on/off transition count during the configured continuous mode transition time period; and
switching, during the off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode comprises:
switching the pump to the continuous pumping mode in response to determining that the counted at least one of the on cycles and the off cycles of the pump is at least equal to the configured continuous mode on/off transition count during the configured continuous mode transition time period.

7. The method of claim 1, where:
determining whether to switch the pump from the one of the sub-pump mode and the continuous pumping mode to the other of the sub-pump mode and the continuous pumping mode based upon the monitored times of the at least one of the on cycles and the off cycles of the pump comprises:
determining, during the continuous pumping mode, whether a configured sub-pump mode transition time period has elapsed during an interval of time after turning the pump off and prior to detecting a high fluid signal associated with the pump; and
switching, during the off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode comprises:
switching the pump to the sub-pump mode in response to determining that the configured sub-pump mode transition time period has elapsed during the interval of time after turning the pump off and prior to detecting the high fluid signal associated with the pump.

8. A system, comprising:
a timer; and
a processor programmed to:
monitor, using the timer, times of at least one of on cycles and off cycles of a variable-speed pump operating in one of a sub-pump mode in which the processor operates the variable-speed pump at maximum capacity, and a continuous pumping mode in which the processor operates the variable-speed pump at decreasing speeds during successive on cycles and iteratively learns from durations of a series of on/off cycles a combined minimum pump speed and longest continuous pumping duration that effectively pumps a quantity of fluid to be pumped;

determine whether to switch the pump from the one of the sub-pump mode and the continuous pumping mode to the other of the sub-pump mode and the continuous pumping mode based upon the monitored times of the at least one of the on cycles and the off cycles of the pump; and switch, during an off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode.

9. The system of claim 8, where the processor is further programmed to:

iteratively reduce, in response to switching the pump to the continuous pumping mode, an operating speed of the pump during subsequent on/off cycles of the pump; and determine, for the subsequent on/off cycles of the pump in the continuous pumping mode, whether the combined minimum pump speed and longest continuous pumping duration has been achieved that effectively pumps fluid to a designated low level prior to expiration of a minimum speed determination time period started at a beginning of each subsequent on/off cycle of the pump in the continuous pumping mode.

10. The system of claim 9, where, in being programmed to, during any subsequent on/off cycle:

iteratively reduce, in response to switching the pump to the continuous pumping mode, the operating speed of the pump during the subsequent on/off cycles of the pump, the processor is programmed to:

turn the pump on at a currently configured incrementally-decreased pump operating speed in the continuous pumping mode in response to detecting a high fluid signal associated with the pump; and configure, in response to turning the pump on at each incrementally-decreased pump operating speed, the minimum speed determination time period; and determine, for the subsequent on/off cycles of the pump in the continuous pumping mode, whether the combined minimum pump speed and longest continuous pumping duration has been achieved that effectively pumps fluid to the designated low level prior to expiration of the minimum speed determination time period started at the beginning of each subsequent on/off cycle of the pump in the continuous pumping mode, the processor is programmed to:

determine, during operation of the pump at each incrementally-decreased pump operating speed, whether a low fluid signal associated with the pump is detected prior to expiration of the minimum speed determination time period.

11. The system of claim 8, where the processor is further programmed to:

adjust one of an electrical preset and a mechanical preset of the pump by predicting a time of a subsequent high fluid signal during the continuous pumping mode; and turn the pump on at a time prior to the subsequent high fluid signal at an operating speed lower than a previous operating speed based upon the adjusted one of the electrical preset and the mechanical preset of the pump.

12. The system of claim 8, where, in being programmed to:

determine whether to switch the pump from the one of the sub-pump mode and the continuous pumping mode to the other of the sub-pump mode and the continuous pumping mode based upon the monitored times of the at least one of the on cycles and the off cycles of the pump, the processor is programmed to:

count, within the sub-pump mode during a configured continuous mode transition time period, at least one of the on cycles and the off cycles of the pump; and determine whether a value of the counted at least one of the on cycles and the off cycles of the pump is at least equal to a configured continuous mode on/off transition count during the configured continuous mode transition time period; and switch, during the off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode, the processor is programmed to:

switch the pump to the continuous pumping mode in response to determining that the counted at least one of the on cycles and the off cycles of the pump is at least equal to the configured continuous mode on/off transition count during the configured continuous mode transition time period.

13. The system of claim 8, where, in being programmed to:

determine whether to switch the pump from the one of the sub-pump mode and the continuous pumping mode to the other of the sub-pump mode and the continuous pumping mode based upon the monitored times of the at least one of the on cycles and the off cycles of the pump, the processor is programmed to:

determine, during the continuous pumping mode, whether a configured sub-pump mode transition time period has elapsed during an interval of time after turning the pump off and prior to detecting a high fluid signal associated with the pump; and switch, during the off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode, the processor is programmed to:

switch the pump to the sub-pump mode in response to determining that the configured sub-pump mode transition time period has elapsed during the interval of time after turning the pump off and prior to detecting the high fluid signal associated with the pump.

14. A computer program product comprising non-transitory a computer readable storage medium including computer readable program code, where the computer readable program code when executed on a computer causes the computer to:

monitor times of at least one of on cycles and off cycles of a variable-speed pump operating in one of a sub-pump mode in which the computer operates the variable-speed pump at maximum capacity, and a continuous pumping mode in which the computer operates the variable-speed pump at decreasing speeds during successive on cycles and iteratively learns from durations of a series of on/off cycles a combined minimum pump speed and longest continuous pumping duration that effectively pumps a quantity of fluid to be pumped;

determine whether to switch the pump from the one of the sub-pump mode and the continuous pumping mode to the other of the sub-pump mode and the continuous pumping mode based upon the monitored times of the at least one of the on cycles and the off cycles of the pump; and switch, during an off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode.

15. The computer program product of claim 14, where the computer readable program code when executed on the computer further causes the computer to:

iteratively reduce, in response to switching the pump to the continuous pumping mode, an operating speed of the pump during subsequent on/off cycles of the pump; and determine, for the subsequent on/off cycles of the pump in the continuous pumping mode, whether the combined minimum pump speed and longest continuous pumping duration has been achieved that effectively pumps fluid to a designated low level prior to expiration of a minimum speed determination time period started at a beginning of each subsequent on/off cycle of the pump in the continuous pumping mode.

16. The computer program product of claim 15, where, in causing the computer to, during any subsequent on/off cycle:

iteratively reduce, in response to switching the pump to the continuous pumping mode, the operating speed of the pump during the subsequent on/off cycles of the pump, the computer readable program code when executed on the computer causes the computer to:

turn the pump on at a currently configured incrementally-decreased pump operating speed in the continuous pumping mode in response to detecting a high fluid signal associated with the pump; and configure, in response to turning the pump on at each incrementally-decreased pump operating speed, the minimum speed determination time period; and determine, for the subsequent on/off cycles of the pump in the continuous pumping mode, whether the combined minimum pump speed and longest continuous pumping duration has been achieved that effectively pumps fluid to the designated low level prior to expiration of the minimum speed determination time period started at the beginning of each subsequent on/off cycle of the pump in the continuous pumping mode, the computer readable program code when executed on the computer causes the computer to:

determine, during operation of the pump at each incrementally-decreased pump operating speed, whether a low fluid signal associated with the pump is detected prior to expiration of the minimum speed determination time period.

17. The computer program product of claim 16, where the computer readable program code when executed on the computer further causes the computer to, during any subsequent on/off cycle:

in response to determining that the low fluid signal associated with the pump is not detected prior to the expiration of any configured minimum speed determination time period:

store the currently configured incrementally-decreased pump operating speed as a minimum effective pump speed for the pump in the continuous pumping mode; and in response to determining that the low fluid signal associated with the pump is detected prior to expiration of any configured minimum speed determination time period:

turn the pump off; and configure a next incrementally-decreased pump operating speed for a next on/off cycle.

18. The computer program product of claim 14, where the computer readable program code when executed on the computer further causes the computer to:

adjust one of an electrical preset and a mechanical preset of the pump by predicting a time of a subsequent high fluid signal during the continuous pumping mode; and turn the pump on at a time prior to the subsequent high fluid signal at an operating speed lower than a previous operating speed based upon the adjusted one of the electrical preset and the mechanical preset of the pump.

19. The computer program product of claim 14, where, in causing the computer to:

determine whether to switch the pump from the one of the sub-pump mode and the continuous pumping mode to the other of the sub-pump mode and the continuous pumping mode based upon the monitored times of the at least one of the on cycles and the off cycles of the pump, the computer readable program code when executed on the computer causes the computer to:

count, within the sub-pump mode during a configured continuous mode transition time period, at least one of the on cycles and the off cycles of the pump; and determine whether a value of the counted at least one of the on cycles and the off cycles of the pump is at least equal to a configured continuous mode on/off transition count during the configured continuous mode transition time period; and switch, during the off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode, the computer readable program code when executed on the computer causes the computer to:

switch the pump to the continuous pumping mode in response to determining that the counted at least one of the on cycles and the off cycles of the pump is at least equal to the configured continuous mode on/off transition count during the configured continuous mode transition time period.

20. The computer program product of claim 14, where, in causing the computer to:

determine whether to switch the pump from the one of the sub-pump mode and the continuous pumping mode to the other of the sub-pump mode and the continuous pumping mode based upon the monitored times of the at least one of the on cycles and the off cycles of the pump, the computer readable program code when executed on the computer causes the computer to:

determine, during the continuous pumping mode, whether a configured sub-pump mode transition time period has elapsed during an interval of time after turning the pump off and prior to detecting a high fluid signal associated with the pump; and switch, during the off cycle of the variable-speed pump, the pump to the other of the sub-pump mode and the continuous pumping mode in response to determining to switch the pump from the one of the sub-pump mode and the continuous pumping mode to the other of the sub-pump mode and the continuous pumping mode, the computer readable program code when executed on the computer causes the computer to:

switch the pump to the sub-pump mode in response to determining that the configured sub-pump mode transition time period has elapsed during the interval of time after turning the pump off and prior to detecting the high fluid signal associated with the pump.

* * * * *